United States Patent [19]

Knothe et al.

[11] Patent Number: 4,664,207

[45] Date of Patent: May 12, 1987

[54] BALANCE WITH A PROTECTIVE BOX-LIKE STRUCTURE

[75] Inventors: Erich Knothe, Eddigehausen; Hans-Heinrich Köhne, Göttingen, both of Fed. Rep. of Germany

[73] Assignee: Sartorius GmbH, Fed. Rep. of Germany

[21] Appl. No.: 839,100

[22] Filed: Mar. 13, 1986

[30] Foreign Application Priority Data

Mar. 13, 1985 [DE] Fed. Rep. of Germany ....... 3508873

[51] Int. Cl.[4] ...................... G01G 23/18; G01G 21/28
[52] U.S. Cl. .................................... 177/181; 177/238
[58] Field of Search .......................... 177/181, 238–241

[56] References Cited

U.S. PATENT DOCUMENTS

| 1,784,098 | 12/1930 | Heusser | 177/181 X |
| 2,614,825 | 10/1952 | Kadlec et al. | 177/181 |
| 4,465,152 | 8/1984 | Schmitter | 177/238 X |

FOREIGN PATENT DOCUMENTS 0461121 10/1968 Switzerland .......................... 177/238

*Primary Examiner*—George H. Miller, Jr.
*Attorney, Agent, or Firm*—Eric P. Schellin

[57] ABSTRACT

In a balance, having a top mounted scale that is protected by a box-like structure (2) consisting of glass, is set on the housing base (1) of the balance. The box-like structure encloses a weighing area (5) on all sides around the balance scale (28) of the housing base (1). The front side of the structure (2), which faces the display and operating console (3), forms a load carrying vertical pane (6) consisting entirely of glass which is connected to a glass back wall (7) by at least one holding and guide track (15, 16) which runs from the upper edge of the front pane to the upper edge of the back pane parallel to the longitudinal axis of the housing, limiting the weighing area (5) at the top. The two side walls of the structure (2) are constructed as all-glass sliding doors (8, 10) which are guided at the bottom in the housing base (1) and at the top as bent side extensions (9, 11) in the associated guide and holding track (15, 16). The side extensions (9, 11) are structural members of the cover of the structure (2) and close and open the weighing area (5) at the top. A bracing member (17) is located for bracing purposes in the area of the back wall (7). This bracket connects the two sides of the housing base (1) in a U-shaped manner and also extends over the slides (8, 10, 12) and the one or two holding and guide tracks (15, 16), additionally fixing the latter in the rear area.

14 Claims, 11 Drawing Figures

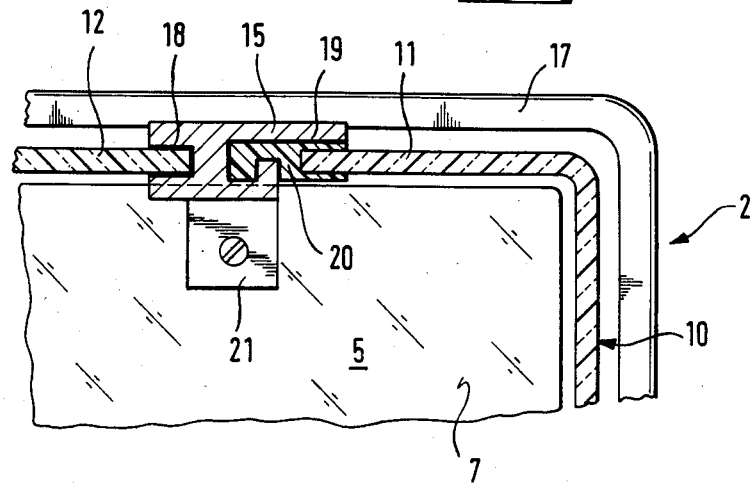
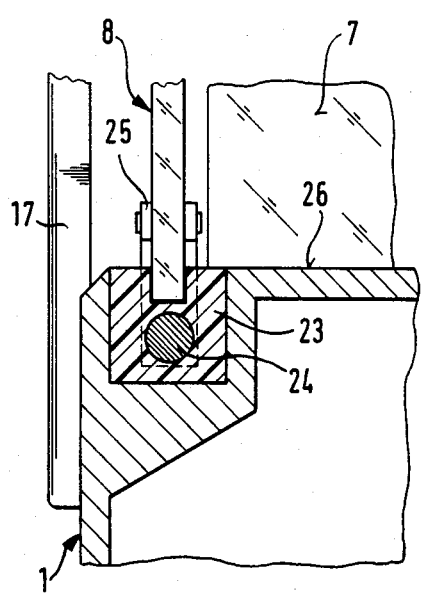
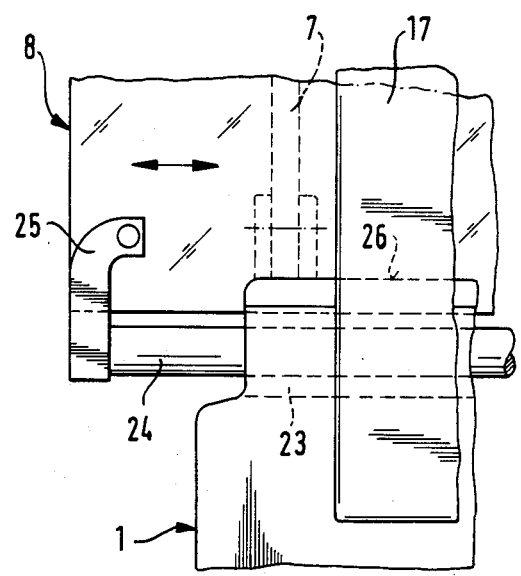

BALANCE WITH A PROTECTIVE BOX-LIKE STRUCTURE

BACKGROUND OF THE INVENTION

The invention is related to a balance having a top mounted scale which is enclosed in a box-like structure to protect the scale from wind disturbances.

Similar balances are discloses in DE-OS No. 33 30 988. The box-like, or cuboid construction, which forms a weighing area around the balance scale protects the scale against the wind and consists, according to the state of the art, of a metallic carrying framework into which a front pane is set in a fixed manner and in which side glass sliding doors are provided. In addition, a part of the cover is frequently provided with a slide, or a removable or pivotable lid, consisting of transparent glass or metal. The two side sliding doors are for loading the balance scale with low containers set on it, from the right or the left side of the balance. The closable opening in the cover of the structure is for loading relatively tall containers and, for pipetting slender-necked laboratory containers.

These balances are primarily high resolution analytical balances having electronic displays. Accordingly, the material to be weighed is located in the weighing area, which is closed on all sides and screens the balance scale during the weighing, from disturbing external influences, which could distort the weighing result.

Bordering the glass with a metallic supporting framework makes it more difficult, to a greater or lesser extent, to see into the weighing area. This also applies to the accessibility of the weighing area and of the balance scale from the side, especially if the boxlike structure is relatively low.

SUMMARY

This invention has the task of making it easier to see into the weighing area and of improving the accessibility of the weighing area of the balance scale in a balance, without adversely affecting the stability of the structure.

The invention solves this task by providing a load carrying transparent front pane having at least one holding and guide track secured to its top edge that extends longitudinally along the top of the structure to the back wall. Sliding side doors are provided in the structure and have bent extensions corresponding to the top of the structure. By opening the sliding side doors the scale can be accessed from the sides and top.

BRIEF DESCRIPTION OF THE DRAWINGS

The concept of the invention is explained in several embodiments with reference made to the drawings.

FIG. 2 shows a detailed sectional view through the slide guide along line 2—2 in FIG. 1.

FIG. 3 shows a detailed sectional view through the sliding door guide in the base along line 3—3 in FIG. 1.

FIG. 4 shows a detailed view of the sliding door guide in the housing base at the rear foot.

DETAIL DESCRIPTION

Figure 1:
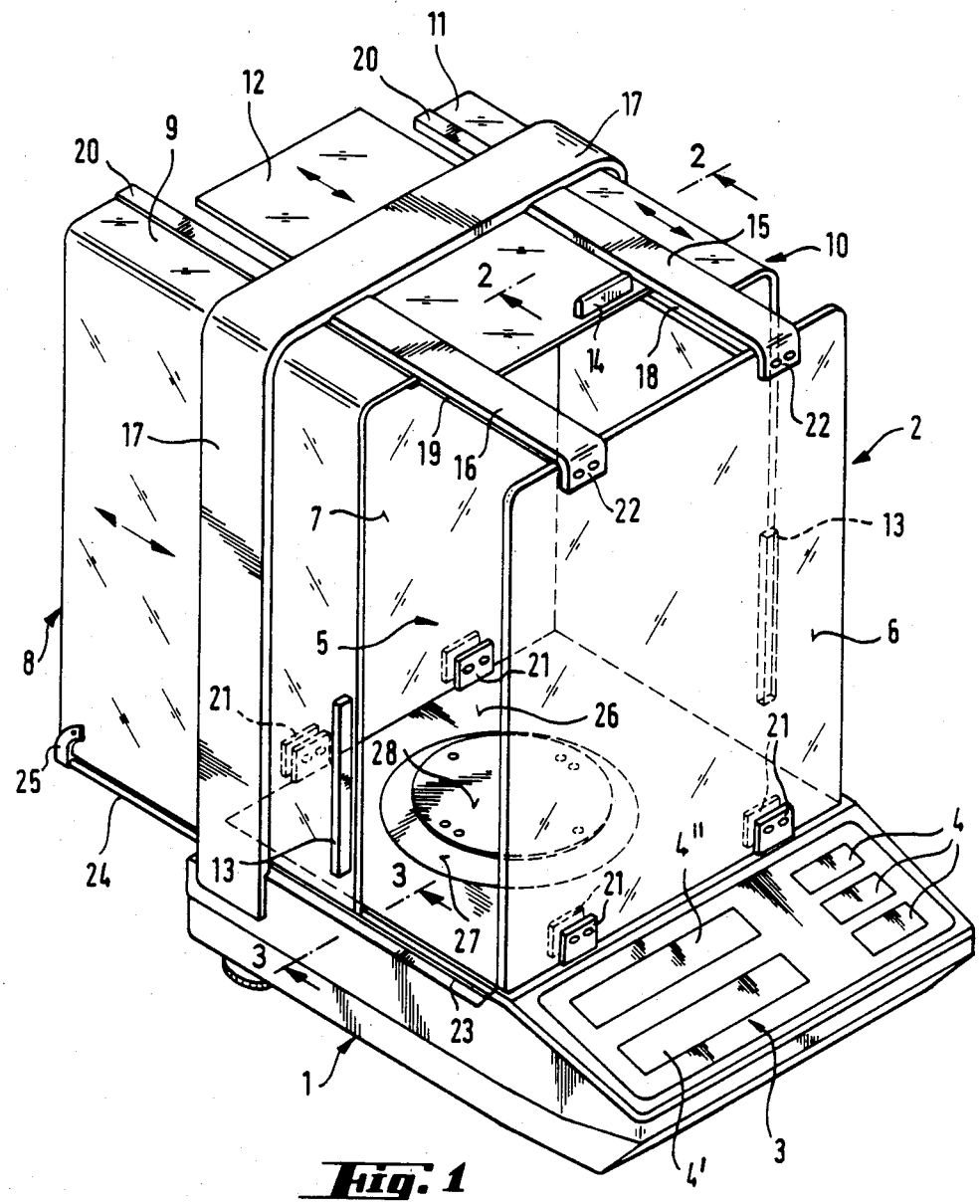
FIG. 1 shows a perspective view of the balance.

In the preferred embodiment, illustrated in FIGS. 1 to 8, the balance comprises housing base 1 which houses all of the electric and electronic components and has an electronic display and operating console 3 in front. Console 3 comprises digital display 4″, tare key 4′ and other keys 4 having alphanumeric symbols. Box-like structure 2 is built around balance scale 28 and is rigidly connected to housing base 1. In the preferred embodiment this box-like structure is enclosed with transparent glass on both sides, the cover and also on the back wall. Front pane 6 and back wall 7 are rigidly connected to housing base 1 by clamping bearings 21. Front pane 6 and back wall 7 are connected at their upper edges to two holding and guide tracks 15, 16 which run parallel to the central longitudinal axis of the balance and are spaced from the side edges of the box-like structure. The guide tracks are provided with clamping bearings 22, and optionally screw bearings, at their ends for holding two all-glass panes 6, 7.

As is evident from FIG. 2, the two holding and guide tracks 15, 16 are constructed in such a manner that top slide 12 can be longitudinally shifted in the cover of the structure in guide groove 18 formed by the tracks. Bent sides 9, 11 are likewise guided in guide groove 19 of the tracks with the aid of guide profile 20. The lateral accessibility of weighing area 5 is considerably improved by bent sliding doors 9, 11 having horizontal extensions, so that relatively low containers set on balance scale 28 can be placed obliquely from above. Balance scale 28 is protected against lateral jolts by housing collar 27 in bottom 26 of weighing area 5.

Relatively high and slender containers, e.g. with liquids, can be placed and pipetted via slide 12 in the cover. Sliding doors 8, 19 and slide 12 have screw down grips 13, 14 formed from plastic or glass.

In order to support the longitudinal movement of sliding doors 8, 10 in the tracks, especially when the sliding doors are fully extended, an additional guide tube 23 in the form of a low-friction plastic channel is located in housing base 1. As can be seen from FIGS. 3 and 4, rod 24 runs along the entire length of the lower sliding door guide in plastic channel 23. The rear ends of sliding doors 8, 10 are supported on bearing clamp 25 on the rear end of rod 24 which prevents opened sliding doors 8, 10 from tipping.

If rear wall 7 is not formed of metal, but rather, as is shown and described, of an all-glass pane, it is recommended for reasons of strength to provide additional bracing of the structure. This is accomplished in the embodiments shown by metallic bracing bracket 17, which is located in the rear area of the structure, and is fastened to both sides of housing base 1 and connects the two sides in a U-shaped manner like a roll-over bar. Bracket 17 extends in a protective manner over the two sliding doors 8, 10, slide 12 and the two holding and guide tracks 15, 16 and fixes the latter to the rear of the scale in addition to the fastening to rear wall 7. As such, the total structure forms a bend-resistant and torsion-resistant box rigidly connected to housing base 1.

Figure 6:
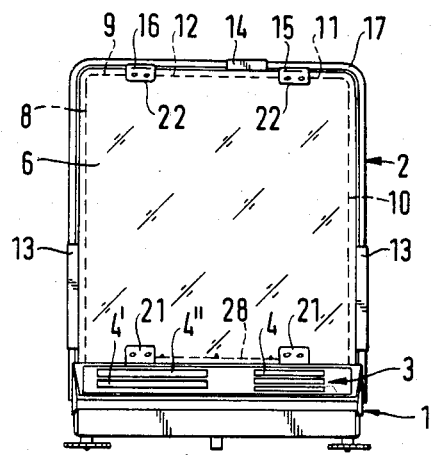
FIGS. 5, 6 and 7 show a proportional side, front and top view of the balance of FIG. 1.
Figure 5:
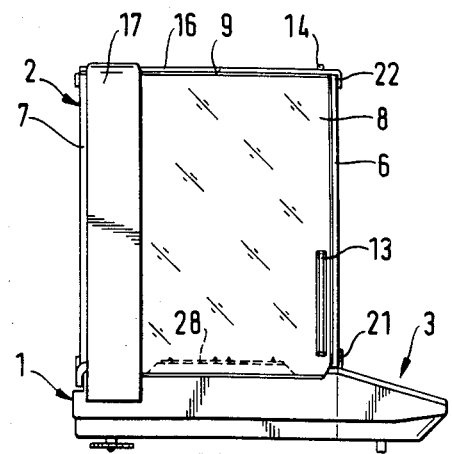
Figure 7:
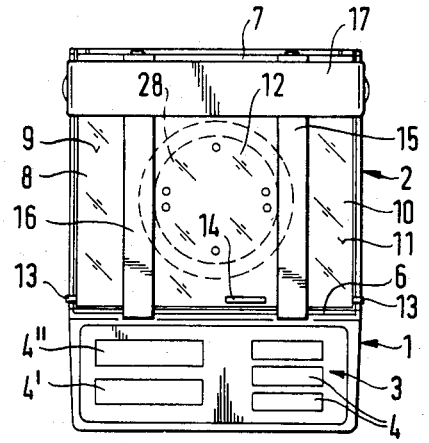
Figure 8:
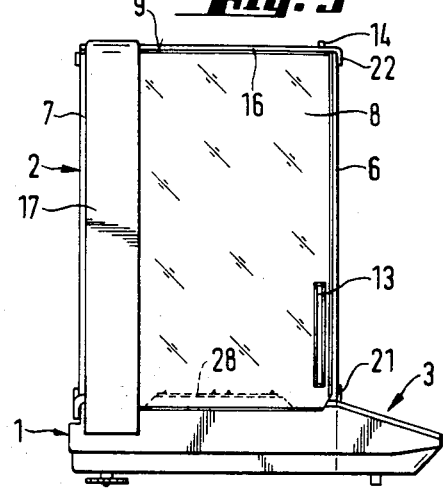
FIG. 8 shows a side view of a balance according to FIG. 1 and FIG. 5 with elevated construction.

FIGS. 5 through 8 essentially show the embodiment of FIG. 1. FIGS. 5 and 6 show a relatively low structure 2 while FIG. 8 shows an extremely tall structure 2. It is especially advantageous to have a bracing means with two holding and guide tracks 15, 16 for the tall structure of FIG. 8.

Figure 9:
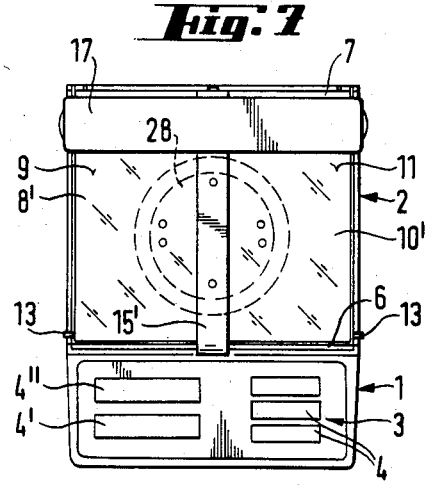
FIG. 9 shows a top view of a varient of FIG. 7 with a centrally located holding and guide track.

In contrast thereto, FIG. 9 shows an embodiment for loading the weighing scale with relatively low, weighing material, such as tablets, jewels and other weighing material in small format. For such applications the weighing area can be kept relatively low. The bracing is achieved according to FIG. 9 by a single holding and guide track 15' positioned along the central longitudinal axis. Sliding doors 8', 10' bent to this holding and guide track 15' permit a favorable selective loading of balance scale 28 from both sides.

Figure 10:
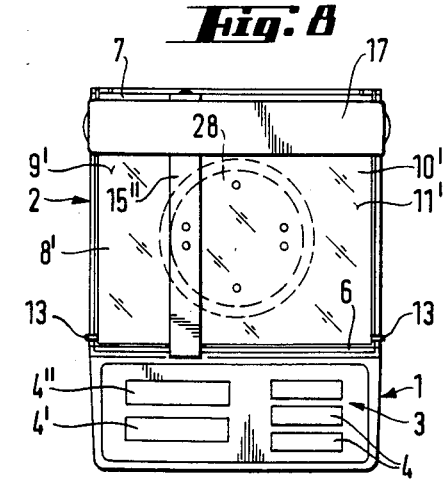
FIG. 10 shows a top view of a variant of FIG. 7 and FIG. 9 with an off center holding and guide track.

FIG. 10 shows an embodiment in which a single holding and guide track 15" is positioned asymmetrically to the side of the central longitudinal axis and divides the cover of the structure approximately ⅓ to ⅔ along the central longitudinal axis. Containers having a narrow bottleneck, are not covered by the open structure in this embodiment by holding and guide track 15" which shows the wide extension 11" and are therefore also accessible from the top when sliding door 10' is open. Open sliding door 8', which shows the small extension 9' is used primarily for loading the balance scale or flat containers thereon from the side.

Sliding doors 8, 8', 10, 10' are preferably constructed in one piece, whereby the horizontal extension merges with the vertical plane of the door by a rounded contour into the plane of the cover.

The term "transparent glass" is also intended to include other transparent sheet materials, such as transparent plastic, which may exhibit advantageous qualities appropriate for the present usage.

Figure 11:
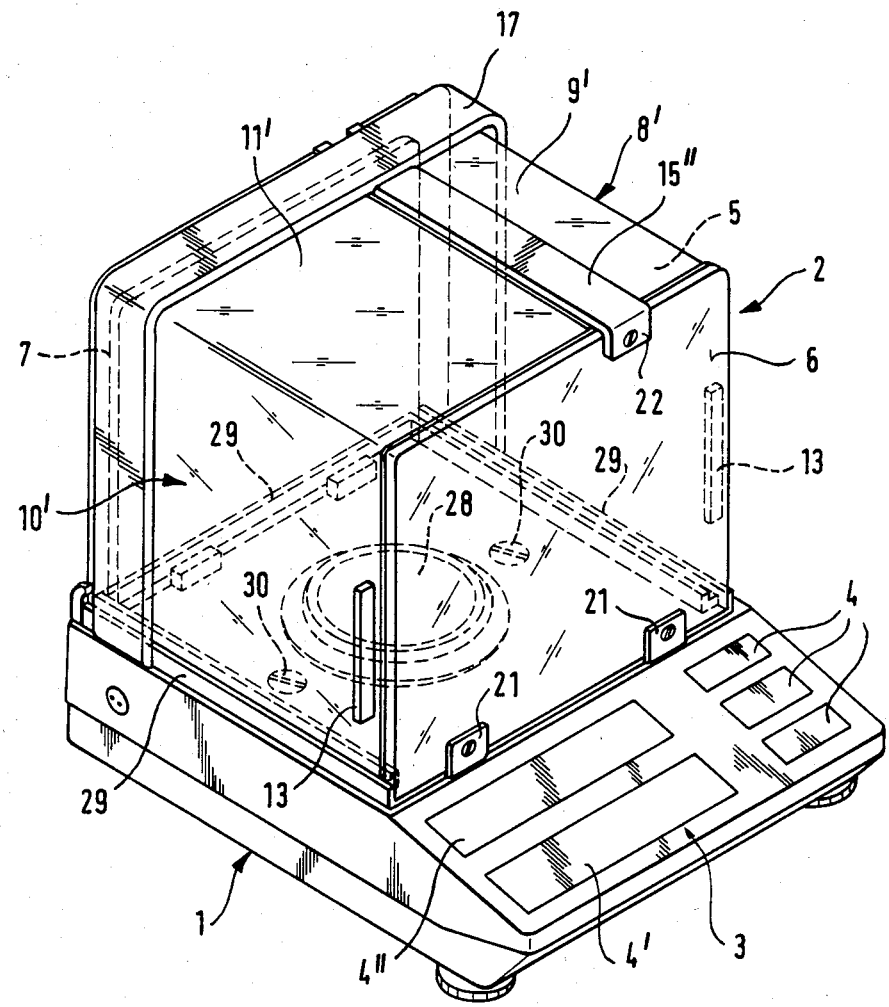
FIG. 11 shows a perspective view of another varient.

A preferred embodiment according to FIG. 11 is constructed analogously to the embodiment of FIG. 10. In distinction thereto, sliding door 8' with the small horizontal extension is located on the other side and structure 2 is constructed as an independent, self-carrying cuboid box. Horizontal connected frame 29 or a connection plate connects all vertical structural members to the unit, and structure 2 is connected to base 1 by screws 30 or by other detachable connection elements.

We claim:

1. A balance having a top mounted balance scale, a housing base (1) with a display and operating console (3), and a box-like structure (2) connected to the housing (1), the structure encloses a weighing area defined by a front pane, two side walls, a back wall and a top wall, (5) around the balance scale (28) of the housing base (1), the weighing area is enclosed with transparent sheets on the front pane, the top wall, and on both side walls, the sides form sliding doors (8, 10) which can be opened to the weighing area (5) and free the access to the balance scale (28), characterized in that the front pane of the structure (2) forms a load carrying vertical pane (6) which is connected to the back wall (7) of the weighing area (5) by at least one holding and guide track (15, 16) which runs from the front pane's upper edge to the back wall's upper edge, parallel to the longitudinal axis of the box-like structure, the holding and guide track marks the limits of the weighing area (5) at the top, and both side walls of the weighing area (5) are constructed as transparent sliding doors (8, 10) which are guided at their bottoms, and at their tops by bent side extensions (9, 11) in the associated guide and holding track (15, 16) whereby the side extensions (9, 11) are components of the cover of the structure (2) and close and open the weighing area (5) on the side and at the top.

2. Balance according to claim 1, characterized in that a single holding and guide track (15') divides the top of the structure (2) along the longitudinal center and that both sliding doors (8', 10') comprise equally large bent side extension (9, 11) which are guided in a single holding and guide track (15').

3. Balance according to claim 1, characterized in that a single holding and guide track (15") is positioned off center in relation to the longitudinal center and divides the top of the structure (2) approximately ⅓ to ⅔ along a longitudinal line, and that the bent slide sides (9', 11') which are appropriately dimensioned are guided off center in relation to the longitudinal center in a single holding and guide track (15").

4. Balance according to claim 1, characterized in that two holding and guide tracks (15, 16) are positioned parallel and off set from the longitudinal center and at a lateral distance from the side edges of the box-like structure and connect the latter to the rigid back wall (7) of the structure (2) and guide the bent side extensions (9, 11) of the sliding doors, and that the opposing longitudinal sides of the holding and guide tracks (15, 16) are constructed as another guide (18) for an upper slide (12) which closes the free space between the latter.

5. Balance according to claim 1, characterized in that the sliding doors (8, 8', 10, 10') are built in one piece and is bent from the vertical plane of the door with a rounded contour into the plane of the top of the box-like structure.

6. Balance according either to claim 1, 2, 3 or 4 characterized in that all electronic and electromechanical components are located in the housing base (1) and that the back wall (7) of the structure (2) is also a load carrying vertical, transparent pane which closes off the weighing area (5) to the rear and is connected to the holding and guide track (15, 16).

7. Balance according to claim 6 characterized in that the bent side extensions (9, 11, 9', 11') of the sliding doors (8, 10) comprise a mating portion running in a guide groove (19) of the holding and guide track (15, 15).

8. Balance according to claim 7, characterized in that the lower edge of the sliding door (8, 10) is guided by a plastic channel in the base part (1) and is supported by a rod (14) guided in a tube (23), whereby the back end of the rod extends under the back end of the sliding door (8, 10).

9. Balance according to either claim 1, 2, 3 or 4, characterized in that in the area of the back wall a bracing bracket (17) connects the two sides of the structure (2) in a U-shaped manner and also extends over the sliding doors (8, 10, 12) and the holding and guide track (15, 16), fixing the latter in the area of the back wall.

10. Balance according to claim 9, characterized in that the holding and guide tracks (15, 16) and the bracing bracket (17) are formed of metal.

11. Balance according to claim 9 characterized in that the holding and guide tracks (15, 16) are formed from plastic.

12. Analytical balance having a top mounted balance scale, a housing base (1), carrying the balance scale (28), having a display and operating console (3), and a box-like structure (2) which surrounds the balance scale (28) in an aerodynamically protective manner and comprises transparent surfaces which comprise lateral and upper sliding doors (8, 10, 12) which make it possible to load the balance scale (28) with material to be weighed from both sides and from above, characterized in that the box-like structure is provided with a front wall, two side walls, a top wall, and a back wall which are formed from transparent material and define a weighing area (5), whereby both the front wall and the back wall form load carrying transparent panes (6, 7) whose upper edges are connected by at least one holding and guide track (15, 15', 15'', 16) running parallel to and at a lateral distance from the sides of the structure (2) and that the side, walls are both transparent and form sliding doors (8, 8', 10, 10') which are guided on their lower edges and are provided with a bent extensions (9, 9', 11, 11') bent into the plane of the cover of the structure (2), the free end of which is guided by the associated holding and guide track (15, 16) and closes the weighing area (5) at the top in a transparent manner, and that a bracing bracket (17) extends vertically over the structure in a U-shaped manner near the back wall of the structure (2), whereby the holding and guide track (15, 15', 15'', 16) is additionally anchored to this bracing bracket (17), and limits the maximum distance the sliding doors (8, 8', 10, 10') can shift to the rear.

13. Balance according to claim 12, characterized in that the structure (2) is formed on the bottom as a self-carrying cuboid box by means of a horizontal connection frame (29) and can be connected to the housing base (1) by detachable connection elements (30).

14. Balance according to claim 12 characterized in that the box-like structure (2) is formed on the bottom as a self-carrying cuboid box by means of a connection plate that can be connected to the housing base (1) by detachable connection elements (30).

* * * * *